(12) United States Patent
Kruglick (10) Patent No.: US 8,447,853 B2
(45) Date of Patent: May 21, 2013

(54) AGENT-LESS FOLLOW-ME SERVICE FOR CLOUD-BASED APPLICATIONS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 256 days.

(21) Appl. No.: 12/999,784

(22) PCT Filed: Jun. 4, 2010

(86) PCT No.: PCT/US2010/037433
§ 371 (c)(1),
(2), (4) Date: Dec. 17, 2010

(87) PCT Pub. No.: WO2011/152833
PCT Pub. Date: Dec. 8, 2011

(65) Prior Publication Data
US 2011/0302297 A1 Dec. 8, 2011

(51) Int. Cl.
*G06F 15/16* (2006.01)
*G06F 15/173* (2006.01)
(52) U.S. Cl.
USPC ........... 709/224; 709/203; 709/223; 709/226; 709/246
(58) Field of Classification Search
USPC .. 709/206, 226, 246; 707/5, 999.01; 713/182; 718/100
See application file for complete search history.

(56) References Cited

U.S. PATENT DOCUMENTS

| 7,483,983 B1 * | 1/2009 | Bonefas et al. ............... 709/226 |
| 7,584,194 B2 * | 9/2009 | Tuttle et al. .............. 707/999.01 |
| 7,673,340 B1 * | 3/2010 | Cohen et al. .................... 726/22 |
| 8,095,663 B2 * | 1/2012 | Bonefas et al. ............... 709/246 |
| 2005/0268301 A1 * | 12/2005 | Kelley et al. .................. 718/100 |
| 2006/0230011 A1 * | 10/2006 | Tuttle et al. ...................... 706/62 |
| 2007/0204166 A1 * | 8/2007 | Tome et al. .................... 713/182 |
| 2009/0216758 A1 * | 8/2009 | Tuttle et al. ....................... 707/5 |
| 2010/0088205 A1 * | 4/2010 | Robertson ..................... 709/226 |
| 2010/0262663 A1 * | 10/2010 | Andrews et al. .............. 709/206 |

OTHER PUBLICATIONS

International Search Report dated Sep. 15, 2010 in International Application No. PCT/US10/37433.
Kwak, Ji-Young, "Follow-Me Services Framework Using the Session Initiation Protocol", Dec. 18, 2007, downloaded Dec. 14, 2010 from http://www.icict.gov.eg/ICICT2007/icictpresentation/Session%203C/Session%203C/Follow-Me%20Services%20Framework% 20using%20the%20Session%20Initiation%20Pr.pdf, 14 pages.

(Continued)

*Primary Examiner* — Quang N Nguyen
(74) *Attorney, Agent, or Firm* — Hope Baldauff, LLC (57) ABSTRACT

Technologies are generally described herein for providing an agent-less follow-me service. An example web browser may be configured to receive a first link to a reference table from a portable token. The web browser may be configured to retrieve a second link to an on-going web application from the reference table. The second link may reflect a first state of the on-going web application. The web browser may be configured to open the on-going web application corresponding to the second link. As a user interacts with the on-going web application, the on-going web application may be configured to transition from the first state to a second state. The web browser may be configured to update the second link in the reference table to reflect the second state of the on-going web application.

18 Claims, 6 Drawing Sheets

OTHER PUBLICATIONS

Martin, Ben, "GTK+2: Let the Application Follow You!" downloaded Dec. 14, 2010 from http://ldn.linuxfoundation.org/article/gtk2-let-application-follow-you, 3 pages.

Takashio et al., "A Mobile Agent Framework for Follow-me Applications in Ubiquitous Computing Environment", Apr. 16-19, 2001, Proceedings of the 21$^{st}$ International Conference on Distributed Computer Systems Workshops (ICDCSW '01, IEEE, Abstract.

"Bluetooth PC LockItNow," accessed at http://blueshareware.com/lockitnow.asp accessed on Apr. 13, 2012, pp. 3.

* cited by examiner

AGENT-LESS FOLLOW-ME SERVICE FOR CLOUD-BASED APPLICATIONS

BACKGROUND

Unless otherwise indicated herein, the materials described in this section are not prior art to the claims in this application and are not admitted to be prior art by inclusion in this section.

A follow-me service can preserve an on-going session even as a user moves between multiple computing devices operating in varying computing environments. Follow-me services can be implemented through agents, which are programs that facilitate the exchange of data related to the on-going session between the computing devices. For example, a user may execute an application on a first computing device, thereby initiating a session on the first computing device. While the application is still open on the first computing device, the user may move from the vicinity of the first computing device to the vicinity of a second computing device. Agents can then migrate the on-going session from the first computing device to the second computing device. In this way, the user can continue interacting with the application on the second computing device as if the user were still executing the application on the first computing device.

In order to facilitate migration of the on-going session, a user may pre-install and pre-configure the agents on both the first and second computing devices. The process of installing and configuring the agents in advance of the migration can be tedious and time-consuming. Further, this process generally assumes that the user has advance knowledge of the computing devices that the user will be using.

SUMMARY

The present disclosure generally describes a computer-implemented method for providing a follow-me service. According to some example methods, a computing device having a processor and a memory may be configured to perform one or more of the following operations. The computing device is configured to receive a first link to a reference table. The first link may include a second link corresponding to a first state of an on-going web application. The computing device is configured to retrieve the second link from the reference table via the first link. The computing device is configured to open the on-going web application corresponding to the second link on a web browser configured to execute on the computing device. Upon opening the on-going web application on the web browser, the computing device is configured to update the second link in the reference table to reflect a second state of the on-going web application.

The present disclosure generally describes some computer storage media. Some example computer storage media may include computer-executable instructions stored thereon for a method which, when executed by a computer, adapt the computer to provide a follow-me service. According to some example methods, the computer may be configured to perform one or more of the following operations. The computer is configured to receive an indication that a portable token is within a proximity of the computer. When the indication is received that the portable token is within the proximity of the computing device, the computer is configured to receive a first link to a reference table from the portable token. The reference table may include a second link corresponding to a first state of an on-going web application. The computer is configured to retrieve the second link from the reference table via the first link. The computer is configured to open the on-going web application corresponding to the second link on a web browser executed by the computer. When the on-going web application is opened, the computer is configured to update the second link in the reference table to reflect a second state of the on-going web application. The computer is configured to receive an indication that the portable token is outside the proximity of the computer. When the indication that the portable token is outside the proximity of the computer is received, the computer is configured to close the on-going web application on the web browser.

The present disclosure generally describes some computer systems configured to provide a follow-me service. Some example computer systems may be configured to include a processor, a memory coupled to the processor, and a web browser which executes in the processor from the memory. Some example computer systems may be further configured to include a web browser plug-in coupled to the web browser. Some example web browser plug-ins may be adapted to execute in the processor from the memory and, when executed by the processor, cause the computer system to provide the follow-me service by performing one or more of the following operations. The computer system is configured to receive an indication that a portable token is within a proximity of the computer system. Upon receiving the indication that the portable token is within the proximity of the computer system, the computer system is configured to receive a first link to a reference table. The reference table may include a second link corresponding to a first state of an on-going web application. The computer system is configured to retrieve the second link and a corresponding cookie from the reference table via the first link. The computer system is configured to transmit the cookie and a request to access the on-going web application to the second link. Upon transmitting the cookie and the request to access the on-going web application to the second link, the computer system is configured to receive permission to access the on-going web application from the second link. Upon receiving the permission to access the on-going web application, the computer system is configured to update the on-going web application corresponding to the second link on the web browser. Upon opening the on-going web application, the computer system is configured to update the second link in the reference table to reflect a second state of the on-going web application. The computer system is configured to receive an indication that the portable token is outside the proximity to the computer system. Upon receiving the indication that the portable token is outside the proximity to the computer system, the computer system is configured to determine whether the reference table reflects a current state of the on-going web application. Upon determining that the reference table does not reflect the current state of the on-going web application, the computer system is configured to update the second link in the reference table to reflect the current state of the on-going web application. Upon determining that the reference table reflects the current state of the on-going web application or upon updating the second link in the reference table to reflect the current state of the on-going web application, the computer system is configured to close the on-going web application on the web browser.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to an agent-less follow-me service provided for cloud-based applications. In an illustrative implementation, a user may carry a portable token containing a link, such as a uniform resource locator ("URL"), to a cloud-based, user-specific reference table. When the user enters the vicinity of a first computing device, the first computing device may be configured to establish a logical connection with the portable token. The user may then open one or more stateless, cloud-based web applications through a first web browser operating on the first computing device. As the user interacts with the web applications, the links of the corresponding web applications may change to reflect the current state of the web applications. As the links change, a first follow-me browser plug-in coupled to the first web browser may upload and store the links to the user-specific reference table identified by the portable token.

The logical connection described above may be established as a communication link or some other variety of logical association between the first computing device and the portable token. Although the connection between the first computing device and the portable token is not necessarily a physical connection, for simplicity the communication link and/or logical association will simply be referred to hereinafter as a "connection."

The user may leave the vicinity of the first computing device while at least some of the web applications are still open. These open web applications may be referred to as on-going web applications. When the user leaves the vicinity of the first computing device, the first computing device may lose connection with the portable token. When the first computing device loses connection with the portable token, the first follow-me browser plug-in may upload and store the links of the on-going web applications to the user-specific reference table, thereby preserving a current state of the on-going web applications on the user-specific reference table. The first follow-me browser plug-in may then close the on-going web applications running on the first computing device.

Upon leaving the vicinity of the first computing device, the user may enter the vicinity of a second computing device. When the user enters the vicinity of the second computing device, the second computing device may establish a connection with the portable token. A second follow-me browser plug-in coupled to a second web browser operating on the second computing device may download the links from the user-specific reference table identified by the portable token. When the second follow-me browser plug-in downloads the links, the second web browser may open the on-going web applications corresponding to the links. Since the links in the user-specific reference table reflect the current state of the on-going web applications, the user can open and interact with the on-going web applications in the current state via the second web browser. In this way, the user can seamlessly transition from the first computing device to the second computing device without manually saving and closing the web applications on the first device and manually reopening the web applications on the second device. Further, the portable token and the follow-me browser plug-in can provide the follow-me service without the use of agents.

Figure 1:
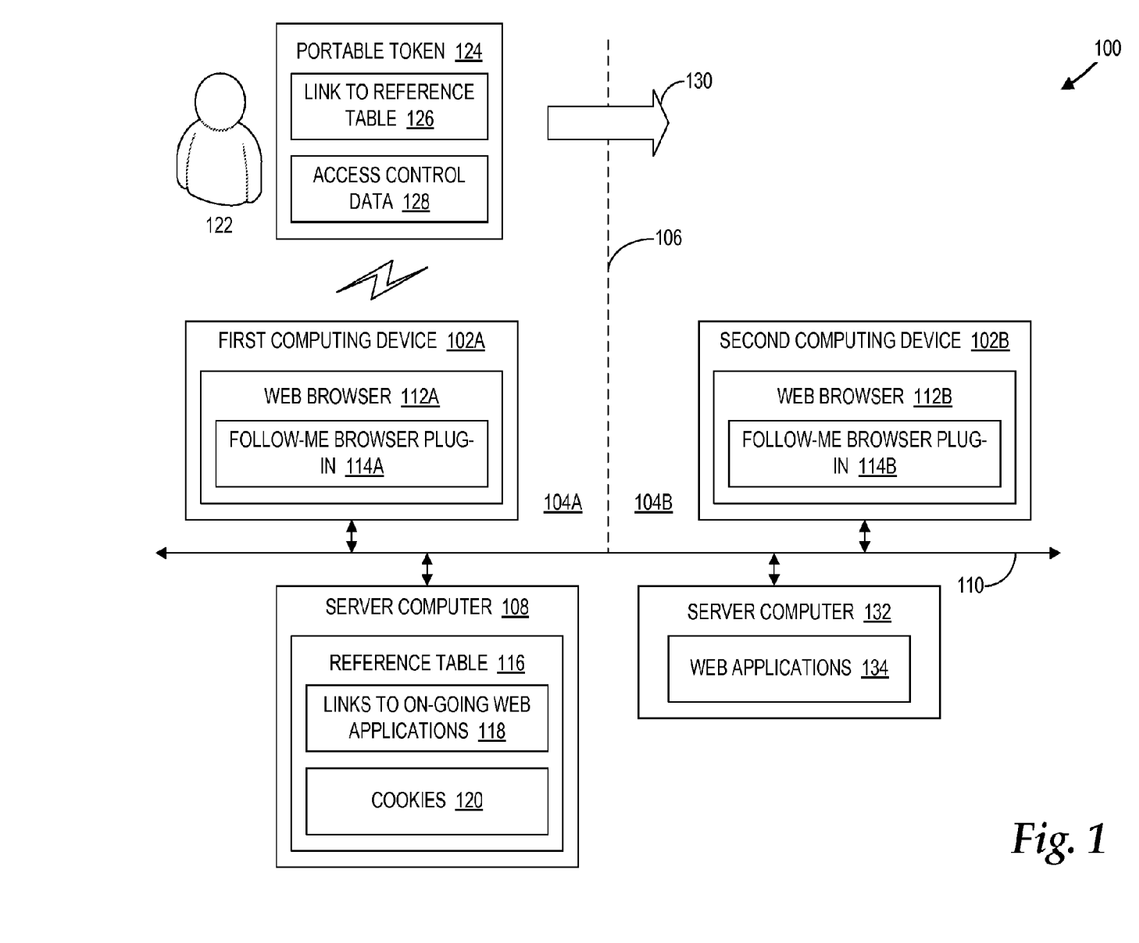
FIG. 1 is a functional block diagram illustrating an example operating environment for an agent-less follow-me service.

Turning now to FIG. 1, a functional block diagram 100 illustrates an example operating environment for an agent-less follow-me service according to at least some embodiments presented herein. A first computing device 102A may operate within a first vicinity 104A, and a second computing device 102B may operate within a second vicinity 104B. For clarity of illustration, the first vicinity 104A and the second vicinity 104B are separated by a dashed line 106 in FIG. 1. The first computing device 102A and the second computing device 102B may be coupled to a server computer 108 and a server computer 132 via a network 110, such as a local area network ("LAN"), a wide area network ("WAN"), the Internet, or the like. The first computing device 102A may include a first web browser 112A and a first follow-me browser plug-in 114A coupled to the first web browser 112A. The second computing device 102B may include a second web browser 112B and a second follow-me browser plug-in 114B coupled to the second web browser 112B. The server computer 108 may include a reference table 116 containing links 118 to on-going web applications and cookies 120 corresponding to the links 118. The server computer 132 may include one or more web applications 134.

The first computing device 102A and the second computing device 102B may be configured to operate in similar or different computing devices. For example, the first computing device 102A and the second computing device 102B may operate under different operating systems. Similarly, the first web browser 112A and the second web browser 112B may be similar or different web browsers. Further, the first follow-me browser plug-in 114A and the second follow-me browser plug-in 114B may be different, depending on the first web browser 112A and the second web browser 112B. The computing devices 102A, 102B may be any appropriate computing device, including but not limited to desktop computers, laptop computers, mobile phones, and other suitable devices adapted to access the web applications 134 via the web browsers 112A, 112B.

The first web browser 112A and the second web browser 112B may be adapted to open stateless, cloud-based web applications, such as the web applications 134. In a cloud-based web application, a server computer, such as the server computer 132, may be configured to host the web application. A web browser, such as the web browsers 112A, 112B, operating on a client computer can then open the web application hosted on the server computer via a corresponding link, such as the links 118. Although the server computer hosts the web application, some of the web code provided by the server computer to the client computer may contain state information that can be stored on the client computer. However, with a stateless, cloud-based web application, the state information may be encoded within the link, which may also result in relatively longer links. For example, the state information may be encoded as a string of hexadecimal characters contained at the end of the link after a character such as "?".

A user 122 may possess a portable token 124, which can be a physical item adapted to store a link 126 to the reference table 116. The reference table 116 may be specific to the user 122. In some embodiments, the portable token 124 may also be configured to store access control data 128 for accessing the reference table 116. Some examples of the portable token 124 may include a flash drive, a mobile phone, a key fob, a hard-coded Radio Frequency Identification ("RFID") tag, and other suitable devices that can be maintained in the possession of the user 122 even when the user 122 travels. When the user 122 possessing the portable token 124 enters the first vicinity 104A, the portable token 124 may establish a connection to the first computing device 102A via Universal Serial Bus ("USB"), WI-FI, BLUETOOTH, Radio Frequency ("RF"), or other suitable communications protocols. In the case of USB and other pluggable protocols, the first vicinity 104A may refer to the act of the user 122 plugging the portable token 124 into the first computing device 102A. In the case of WI-FI, BLUETOOTH, RF, IR and other wireless protocols, the first vicinity 104A may refer to a range where the portable token 124 and the first computing device 102A can communicate via the corresponding wireless protocol. If the portable token 124 is an RFID tag, then a RFID reader (not shown) coupled to the first computing device 102A may be configured to interrogate and/or read the RFID tag when the RFID tag is within a range of the RFID reader. Thus, the user 122 can place the RFID tag within the range of the RFID reader to indicate that the user 122 has entered the first vicinity 104A.

In some embodiments, the portable token 124 may be signal strength-gated such that the portable token 124 is enabled and/or disabled according to a given signal strength between the portable token 124 and the first computing device 102A. In some other embodiments, the portable token 124 may be time-gated such that the portable token 124 is enabled and/or disabled after certain amount of time has passed (e.g., a timeout). The portable token 124 may or may not contain a processor and/or a data storage device.

In an illustrative example, the user 122 possessing the portable token 124 may enter the first vicinity 104A. The first computing device 102A may be configured to establish a connection (e.g., via wireless communication) with the portable token 124. The first follow-me browser plug-in 114A can be adapted to read the link 126 to the reference table 116 and attempt to access the reference table 116 via the link 126. In some embodiments, the user 122 may install the first follow-me browser plug-in 114A when the first computing device 102A establishes the connection to the portable token 124. In one example, the user 122 may download the first follow-me browser plug-in 114A from a central download website via the network 110. In another example, the first follow-me browser plug-in 114A may be stored in the portable token 124 and installed to the first computing device 102A from the portable token 124. In some other embodiments, the first follow-me browser plug-in 114A may be pre-installed on the first computing device 102A. In yet some other embodiments, the first follow-me browser plug-in 114A may be a standard feature on the first web browser 112A.

When the first follow-me browser plug-in 114A attempts to access the reference table 116, the server computer 108 may be adapted to request credentials, such as a login identifier and/or a password, in order to grant permission to access the reference table 116. In some embodiments, the user 122 may manually enter the credentials via a suitable input device coupled to the first computing device 102A. In some other embodiments, the portable token 124 may be adapted to provide the access control data 128 containing the credentials to the server computer 108. In this case, for security purposes, the portable token 124 may also include a mechanism adapted to enable the user 122 to permit or restrict whether the portable token 124 shares the access control data 128. When the server computer 108 receives the credentials from the user 122 or the portable token 124, the server computer 108 may be adapted to grant permission to access to the reference table 116 upon verifying the credentials.

In some embodiments, the portable token 124 may be replaced with a web address that identifies a reference table service and/or a personal login identifier. In this way, the user 122 can simply memorize the web address and/or the personal login identifier without having to carry the portable token 124. The web address and the personal login identifier may also be utilized in addition to the portable token 124 in instances where the user 122 does not have the portable token 124 in possession. The reference table service may provide user-specific reference tables, such as the reference table 116, to multiple users and assign a different personal login identifier to each of the users. Thus, the user 122 may open the first web browser 112A and manually enter the web address to the reference table service along with the personal login identifier in order to access the reference table 116. The web address may also contain the personal login identifier (e.g., myreferencetable.com/user4110 where "user4110" refers to the personal login identifier).

In the illustrative example, the reference table 116 is initially empty. Thus, when the first follow-me browser plug-in 114A accesses the reference table 116, the first follow-me browser plug-in 114A may not retrieve any links from the reference table 116, and thus no web applications may automatically open. When the user 122 opens one or more of the web applications 134 via the first web browser 112A, the links 118 corresponding to the web applications may change to reflect the current state of the web applications 134. That is, the state information encoded in the links 118 may change as the user 122 interacts with the web applications 134. For example, a user may edit a document on a particular web application. After the user edits and saves the document, the URL may change from "http://docs.example.com/Doc?docid=01234abcdefg" to
"http://docs.example.com/Doc?docid=56789hijklmn"
where the variable "docid" refers to the document being edited and a particular state of the document being edited.

In order to facilitate the follow-me service, the first follow-me browser plug-in 114A may be configured to upload and store the links 118 of the web applications 134 to the reference table 116, thereby preserving a current state of the web applications 134. The first follow-me browser plug-in 114A may be configured to upload and store the links 118 at given time intervals or when the links 118 are changed on the first web browser 112A. In some embodiments, the first follow-me browser plug-in 114A may be adapted to compare the current link to the previous link in order to determine whether the link has changed. In some other embodiments, the first web browser 112A may be configured to provide signals to the first follow-me browser plug-in 114A indicating that the link has changed.

Some web applications may be adapted to request and verify credentials of the user 122 before granting access. After the user 122 has entered the credentials and logged on a web application, the credentials may be stored in a corresponding cookie on the first computing device 102A. Each time the user 122 re-accesses the web application, the web application can be configured to authenticate the user 122 based on the cookie without having the user 122 re-enter the credentials. In some embodiments, the first follow-me browser plug-in 114A may be configured to upload the cookie from the first computing device 102A to the cookies 120 in the reference table 116. As described in greater detail below, when the user 122 moves to another computing device, such as the second computing device 102B, the second web browser 112B may be configured to retrieve the cookies 120 from the reference table 116 and utilize the cookies 120 to open the web applications 134 corresponding to the links 118 without having the user 122 re-enter the credentials. When the user 122 closes a web application (e.g., by closing the corresponding window of the web browser 112A), the first follow-me browser plug-in 114A may be adapted to delete the link and the cookie corresponding to the closed web application from the reference table 116.

In the illustrative example, the user 122 may leave the first vicinity 104A while at least one of the web applications 134 remains open on the first computing device 102A. When the first follow-me browser plug-in 114A detects that the user 122 has left the first vicinity 104A, the first follow-me browser plug-in 114A may be configured to upload and store the links 118 of the web applications 134, as necessary, if the links 118 do not reflect the current state of the web applications 134. The first follow-me browser plug-in 114A may then be adapted to close the web applications 134 in order to prevent others from accessing the web applications 134 on the first computing device 102A.

The first follow-me browser plug-in 114A may be configured to detect that the user 122 has left the first vicinity 104A based a certain amount of time (e.g., a timeout) or by user action. In a first example, the user 122 may explicitly indicate to the follow-me browser plug-in 114A that the user 122 is leaving the first vicinity 104A. If the portable token 124 is an RFID tag, then the RFID reader coupled to the first computing device 102A may be configured to re-interrogate and/or re-read the RFID tag when the RFID tag is placed again within the range of the RFID reader. Thus, after the user 122 has placed, in a first instance, the RFID tag within the range of the RFID reader to indicate that the user 122 entered the first vicinity 104A, the user 122 can place, in a second instance, the RFID tag within the range of the RFID reader to indicate that the user 122 has left the first vicinity 104A. In second example, if the portable token 124 plugs into the first computing device 102A, then the first follow-me browser plug-in 114A may be adapted to detect that the user 122 has left the first vicinity 104A when the user 122 unplugs the portable token 124 from the first computing device 102A. In a third example, if the portable token 124 wirelessly couples to the first computing device 102A, then the first follow-me browser plug-in 114A may be adapted to detect that the user 122 has left the first vicinity 104A when the first computing device 102A can no longer communicate with the portable token 124 because the portable token 124 has moved beyond the range of communication.

In the illustrative example, upon leaving the first vicinity 104A, the user 122 enters the second vicinity 104B as indicated by an arrow 130. The second computing device 102B may then be adapted to establish a connection with the portable token 124. The second computing device 102B may be configured to download and install the second follow-me browser plug-in on the second web browser 112B, as necessary. The second follow-me browser plug-in 114B may also be configured to read the link 126 to the reference table 116 and access the reference table 116 via the link 126 upon authenticating the user 122, as necessary.

When the second follow-me browser plug-in 114B accesses the reference table 116, the second follow-me browser plug-in 114B may be configured to download the links 118 and the corresponding cookies 120 from the reference table 116. The second follow-me browser plug-in 114B may then be adapted to open the web applications 134 corresponding to the links 118 via the second web browser 112B. The second follow-me browser plug-in 114B may be adapted to utilize the cookies 120 to gain access to the existing sessions when opening the web applications 134. When the second follow-me browser plug-in 114B opens the web applications 134 via the links 118, the second web browser 112B may be configured to present the web applications 134 in the current state (e.g., the state of the web applications running on the first computing device 102A when the user 122 leaves the first vicinity 104A) as preserved by the links 118. In this way, the user 122 can interact with the web applications 134 on the second computing device 102B in the same state as if the user 122 were still in the first vicinity 104A and accessing the web applications 134 on the first computing device 102A.

As the user interacts with the web applications 134, the links 118 may change to reflect the current state of the web applications 134. As the links 118 change, the second follow-me browser plug-in 114B may be adapted to update the reference table 116. Further, when user 122 leaves the second vicinity 104B, the second follow-me browser plug-in 114B may be configured to upload and store the links 118 of the web applications 134 to the reference table 116 if the links 118 do not reflect the current state of the web applications 134. Thus, when the user 122 enters the vicinity of another computing device, the user 122 can continue interacting with the web applications 134 in the preserved state.

Figure 2:
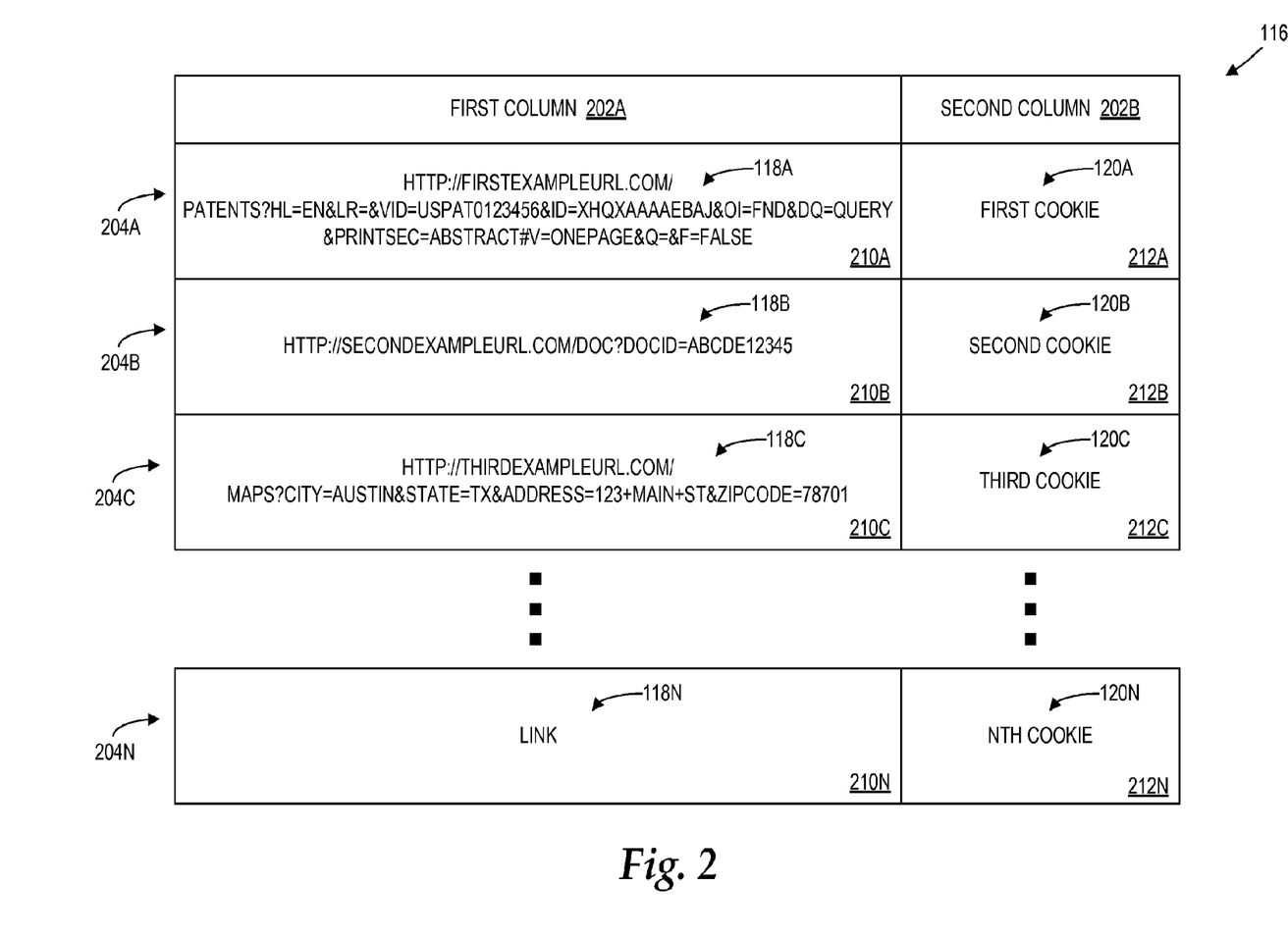
FIG. 2 is a block diagram illustrating an example reference table.

Turning now to FIG. 2, a block diagram illustrates an example reference table 116 arranged in accordance with at least some embodiments described herein. The reference table 116 may include a first column 202A and a second column 202B. The reference table 116 may further include rows 204A-204N. Entries 210A-210N under the first column 202A may store links 118A-118N. The reference table 116 may store the links 118A-118N in Extensible Markup Language ("XML") or other suitable format. Entries 212A-212N under the second column 202B may store cookies 120A-120N. Each of the cookies 120A-120N may correspond to one the links 118A-118N. The cookies 120A-120N may be login cookies adapted to enable the user 122 to store credentials of the user 122. The web browsers 112A, 112B can utilize the cookies 120A-120N to access the corresponding links 118A-118N without having the user 122 re-enter credentials.

When the user 122 opens a web application on the first web browser 112A, the first follow-me browser plug-in 114A may assign one of the rows 204A-204N to the web application. For example, the first follow-me browser plug-in 114A may be configured to assign the first row 204A to the web application. If the user 122 logs on the web application and a cookie, such as the first cookie 120A, is created on the first computing device 102A, the first follow-me browser plug-in 114A may be configured to upload and store the first cookie 120A to the assigned row under the second column 202B. In this example, the first follow-me browser plug-in 114A may be adapted to upload and store the first cookie 120A to the first row 204A in the entry 212A. As the user 122 interacts with the web application, the first follow-me browser plug-in 114A may also be adapted to upload and store a link, such as the first link 118A, of the web application to the assigned row under the first column 202A. In this example, the first follow-me browser plug-in 114A may be adapted to upload and store the first link 118A to the first row 204A in the entry 210A. In this way, the reference table 116 can preserve a current state of the web application. When the user 122 closes the web application, the first follow-me browser plug-in 114A may be configured to delete both the entries, such as the entries 210A, 212A, corresponding to the closed web application. Otherwise, the reference table 116 may be configured to maintain the entries 210A, 212A as the user 122 transitions to other computing devices.

Figure 3A:
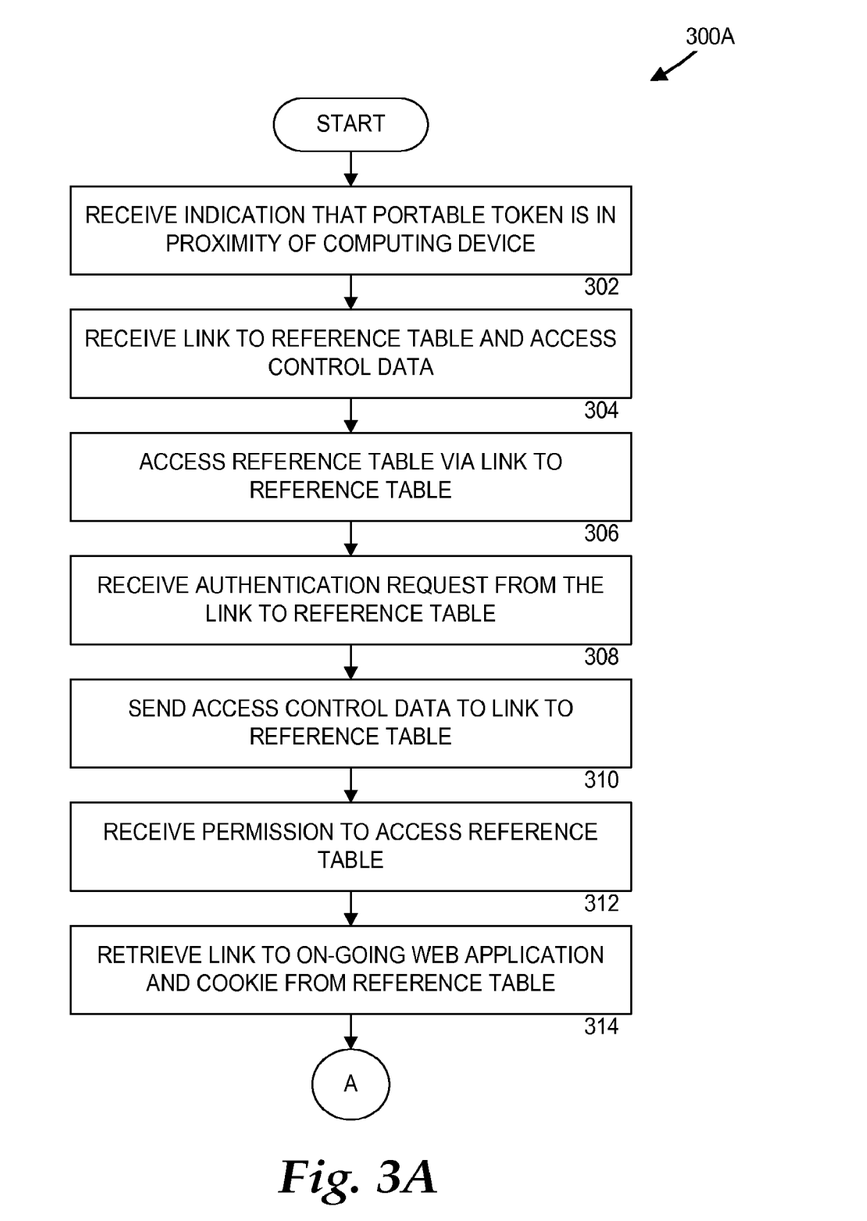
FIGS. 3A and 3B are flow diagrams illustrating an example process for implementing an agent-less follow-me service.
Figure 3B:
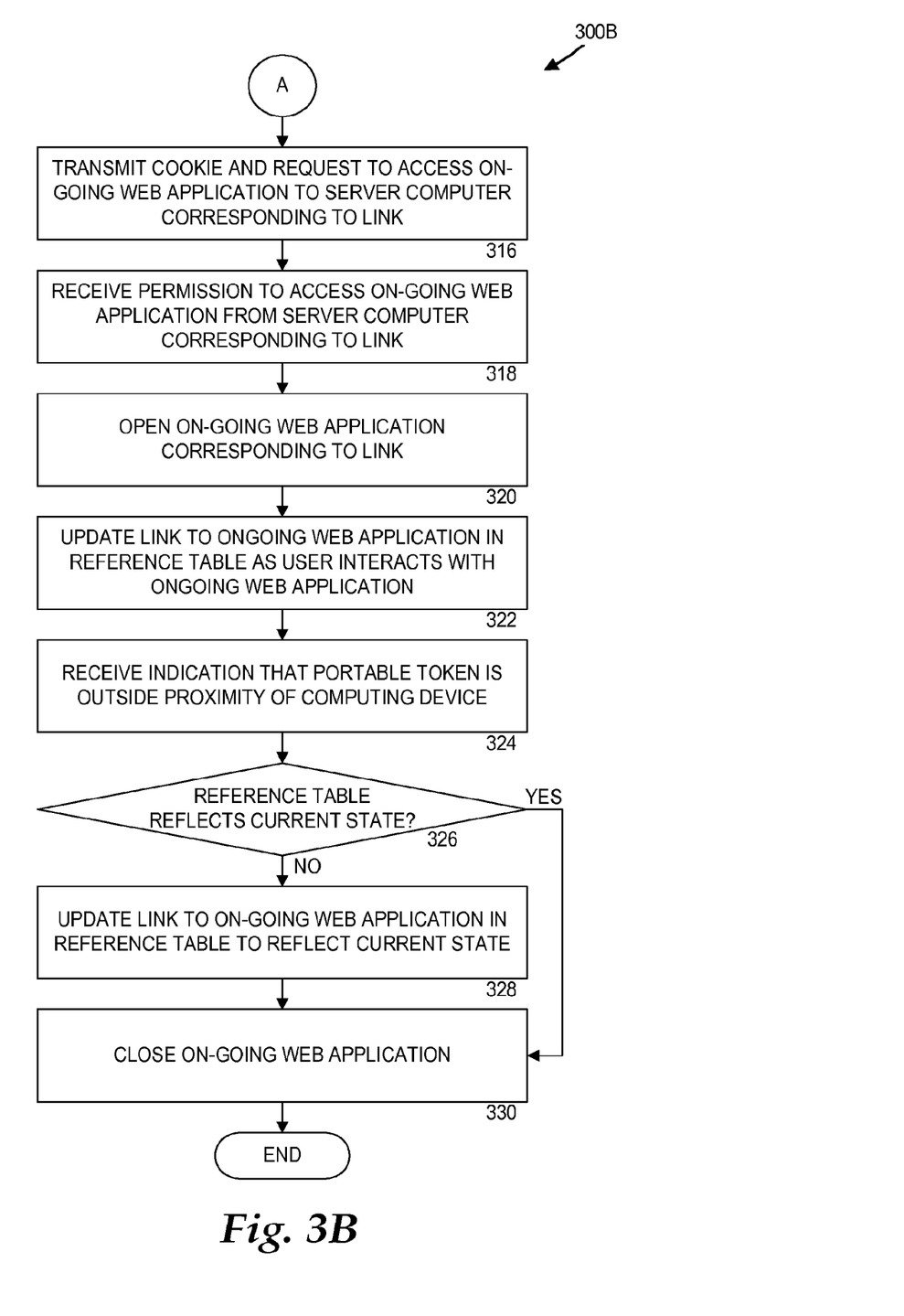

Turning now to FIGS. 3A and 3B, example flow diagrams illustrate a process 300A-300B for providing an agent-less follow-me service in accordance with at least some embodiments described herein. The process 300A-300B may include various operations, functions, or actions as illustrated by one or more of blocks 302-330. The process 300A may begin at block 302 (Receive Indication That Portable Token Is In Proximity), where a follow-me browser plug-in, such as the first follow-me browser plug-in 114A and the second follow-me browser plug-in 114B, may be configured to receive an indication that the portable token 124 is in proximity of a computing device, such as the first computing device 102A and the second computing device 102B. If the portable token 124 is a pluggable device, then the portable token 124 may be determined to be in proximity of the computing device when the portable token 124 is plugged into the computing device. If the portable token 124 is a wireless device, then the portable token 124 may be determined to be in proximity of the computing device when the portable token 124 is within range of the computing device according to the wireless protocol. If the portable token 124 is a RFID tag, then the portable token 124 may be determined to be in proximity of the computing device when the portable token 124 is placed within a range of a RFID reader coupled to the computing device such that the RFID reader can interrogate and/or read the portable token 124. Block 302 may be followed by block 304.

At block 304 (Receive Link to Reference Table and Access Control Data), the follow-me browser plug-in may be configured to receive the link 126 to the reference table 116 and the access control data 128. The access control data 128 may contain credentials for accessing the reference table 116. Block 304 may be followed by block 306.

At block 306 (Access Reference Table), the follow-me browser plug-in may be configured to access the reference table 116 via the link 126. The reference table 116 may be cloud-based and stored on a centralized server computer, such as the server computer 108, accessible over the network 110. Block 306 may be followed by block 308.

At block 308 (Receive Authorization Request), the follow-me browser plug-in may be configured to receive an authorization request from server computer 108 corresponding to the link 126. The authorization request may request credentials in order to grant permission to access the reference table 116. Block 308 may be followed by block 310.

At block 310 (Send Access Control Data), the follow-me browser plug-in may be configured to send the access control data 128 to the server computer 108 in response to the authorization request. Block 310 may be followed by block 312.

At block 312 (Receive Permission), the follow-me browser plug-in may be configured to receive permission to access the reference table 116 from the server computer 108. The server computer 108 may send the permission to access the reference table 116 to the follow-me browser plug-in upon verifying the access control data 128. Block 312 may be followed by block 314.

At block 314 (Retrieve Link to Web Application), the follow-me browser plug-in may be configured to retrieve a link, such as the links 118, to an on-going web application, such as the web applications 134, from the reference table 116. The follow-me browser plug-in may also retrieve a cookie, such as the cookies 120, corresponding to the link to the on-going web application from the reference table 116. The on-going web application may be a stateless, cloud-based application. Block 314 in process 300A may be followed by block 316 in process 300B.

At block 316 (Transmit Cookie and Request to Access Web Application), the follow-me browser plug-in may be configured to transmit the cookie and a request to access the on-going web application to the server computer 132 corresponding to the link to the on-going web application. Block 316 may be followed by block 318.

At block 318 (Receive Permission to Access Web Application), the follow-me browser plug-in may be configured to receive permission to access the on-going web application from the server computer 132. The server computer 132 may send the permission to access the on-going web application to the follow-me browser plug-in and/or the web browser upon verifying the cookie. Block 318 may be followed by block 320.

At block 320 (Open Web Application), the follow-me browser plug-in may be configured to open the web application corresponding to the link to the on-going web application. In particular, the follow-me browser plug-in may be configured to open the web application via a web browser, such as the first web browser 112A and the second web browser 112B. Block 320 may be followed by block 322.

At block 322 (Update Reference Table), the follow-me browser plug-in may be configured to update the reference table 116 to reflect any changes to the current state of the on-going web application. The current state of the on-going web application may change as the user 122 interacts with the on-going web application. In particular, the follow-me browser plug-in may be configured to update the link to the on-going web application stored in the reference table 116. That is, a previous link reflecting a previous state of the on-going web application may be replaced with a current link reflecting a current state of the on-going web application, thereby transforming the reference table 116. The follow-me browser plug-in may be configured to update the reference table 116 when the state of the on-going web application changes. The follow-me browser plug-in may also be configured to update the reference table 116 at a predefined time interval. Block 322 may be followed by block 324.

At block 324 (Receive Indication That Portable Token Is Outside Proximity), the follow-me browser plug-in may be configured to receive an indication that the portable token 124 is outside the proximity of the computing device. If the portable token 124 is a pluggable device, then the portable token 124 may be determined to be outside the proximity of the computing device when the portable token 124 is unplugged from the computing device. If the portable token 124 is a wireless device, then the portable token 124 may be determined to be outside the proximity of the computing device when the portable token 124 is outside the range of the computing device according to the wireless protocol. If the portable token 124 is a RFID tag, then the portable token 124 may be determined to be outside the proximity of the computing device when the portable token 124 is placed again within the range of the RFID reader coupled to the computing device such that the RFID reader can re-interrogate and/or re-read the portable token 124. Block 324 may be followed by block 326.

At block 326 (Determine If Reference Table Reflects Current State), the follow-me browser plug-in may be configured to determine whether the reference table 116 reflects the current state of the on-going web application. For example, the state of the on-going web application may have changed prior to last update of the reference table 116 at block 322. If the follow-me browser plug-in determines that the reference table 116 does not reflect the current state of the on-going web application, then block 326 may be followed by block 328. If the follow-me browser plug-in determines that the reference table 116 reflects the current state of the on-going web application, then block 326 may be followed by block 330.

At block 328 (Update Reference Table to Reflect Current State), the follow-me browser plug-in may be configured to update the reference table 116 to reflect the current state of the on-going web application. Block 328 may be followed by block 330.

At block 330 (Close Web Application), the follow-me browser plug-in may be configured to close the on-going web application running on the computing device. The follow-me browser plug-in can close the on-going web application because the user 122 is outside the proximity to the computing device and because the current state of the on-going web application has been preserved on the reference table 116. The user 122 can transition to other computing devices and interact with the on-going web application on these other computing devices. After block 330, the process 300A-300B may either repeat (e.g., periodically, continuously, or on demand as needed) or terminate.

Figure 4:
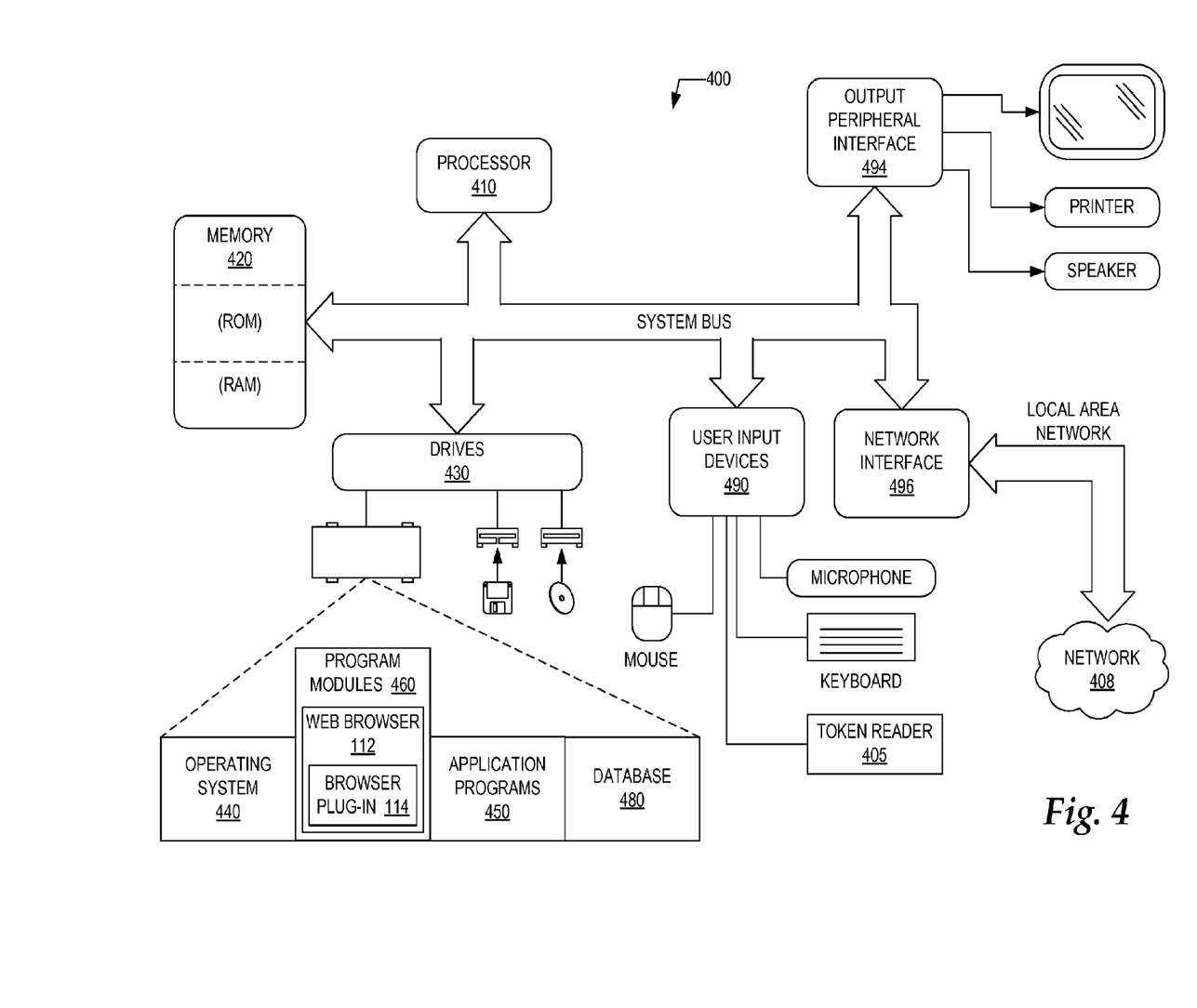
FIG. 4 is a block diagram illustrating an example computing system.

FIG. 4 is a computer architecture diagram showing an illustrative computer hardware architecture for an example computing system capable of implementing at least some embodiments presented herein. FIG. 4 includes a computer 400, including a processor 410, memory 420 and one or more drives 430. The computer 400 may be implemented as a conventional computer system, an embedded control computer, a laptop, or a server computer, a mobile device, a set-top box, a kiosk, a vehicular information system, a mobile telephone, a customized machine, or other hardware platform.

The drives 430 and their associated computer storage media, provide storage of computer readable instructions, data structures, program modules and other data for the computer 400. The drives 430 can include an operating system 440, application programs 450, program modules 460, and a database 480. The program modules 460 may include a web browser 112. The web browser 112 may be coupled to a follow-me browser plug-in 114, such as the first follow-me browser plug-in 114A and the second follow-me browser plug-in 114B. The web browser 112, through the follow-me browser plug-in, may be adapted to execute the process 300A-300B for providing an agent-less follow-me service as described in greater detail above with reference to FIGS. 3A-3B. The computer 400 further includes user input devices 490 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like. In some embodiments, the input devices 490 may also include a token reader 405. The token reader 405 may be adapted to read the portable token 124 via a suitable wired or wireless interface.

These and other input devices can be coupled to the processor 410 through a user input interface that is coupled to a system bus, but may be coupled by other interface and bus structures, such as a parallel port, game port or a universal serial bus ("USB"). Computers such as the computer 400 may also include other peripheral output devices such as speakers, which may be coupled through an output peripheral interface 494 or the like.

The computer 400 may operate in a networked environment using logical connections to one or more computers, such as a remote computer coupled to a network interface 496. The remote computer may be a personal computer, a server, a router, a network PC, a peer device or other common network node, and can include many or all of the elements described above relative to the computer 400. Networking environments are commonplace in offices, enterprise-wide area networks ("WAN"), local area networks ("LAN"), intranets, and the Internet.

When used in a LAN or WLAN networking environment, the computer 400 may be coupled to the LAN through the network interface 496 or an adapter. When used in a WAN networking environment, the computer 400 typically includes a modem or other means for establishing communications over the WAN, such as the Internet or the network 408. The WAN may include the Internet, the illustrated network 408, various other networks, or any combination thereof. It will be appreciated that other mechanisms of establishing a communications link, ring, mesh, bus, cloud, or network between the computers may be used.

According to some embodiments, the computer 400 may be coupled to a networking environment. The computer 400 may include one or more instances of a physical computer-readable storage medium or media associated with the drives 430 or other storage devices. The system bus may enable the processor 410 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 420, whether characterized as RAM, ROM, flash, or other types of volatile or nonvolatile memory technology. The media may also represent secondary storage, whether implemented as the storage drives 430 or otherwise. Hard drive implementations may be characterized as solid state, or may include rotating media storing magnetically-encoded information.

The storage media may include one or more program modules 460. The program modules 460 may include software instructions that, when loaded into the processor 410 and executed, transform a general-purpose computing system into a special-purpose computing system. As detailed throughout this description, the program modules 460 may provide various tools or techniques by which the computer 400 may participate within the overall systems or operating environments using the components, logic flows, and/or data structures discussed herein.

The processor 410 may be constructed from any number of transistors or other circuit elements, which may individually or collectively assume any number of states. More specifically, the processor 410 may operate as a state machine or finite-state machine. Such a machine may be transformed to a second machine, or specific machine by loading executable instructions contained within the program modules 460. These computer-executable instructions may transform the processor 410 by specifying how the processor 410 transitions between states, thereby transforming the transistors or other circuit elements constituting the processor 410 from a first machine to a second machine. The states of either machine may also be transformed by receiving input from the one or more user input devices 490, the network interface 496, other peripherals, other interfaces, or one or more users or other actors. Either machine may also transform states, or various physical characteristics of various output devices such as printers, speakers, video displays, or otherwise.

Encoding the program modules 460 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 460 may transform the physical state of the semiconductor memory 420 when the software is encoded therein. For example, the software may transform the state of transistors, capacitors, or other discrete circuit elements constituting the semiconductor memory 420.

As another example, the storage media may be implemented using magnetic or optical technology such as drives 430. In such implementations, the program modules 460 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 5:
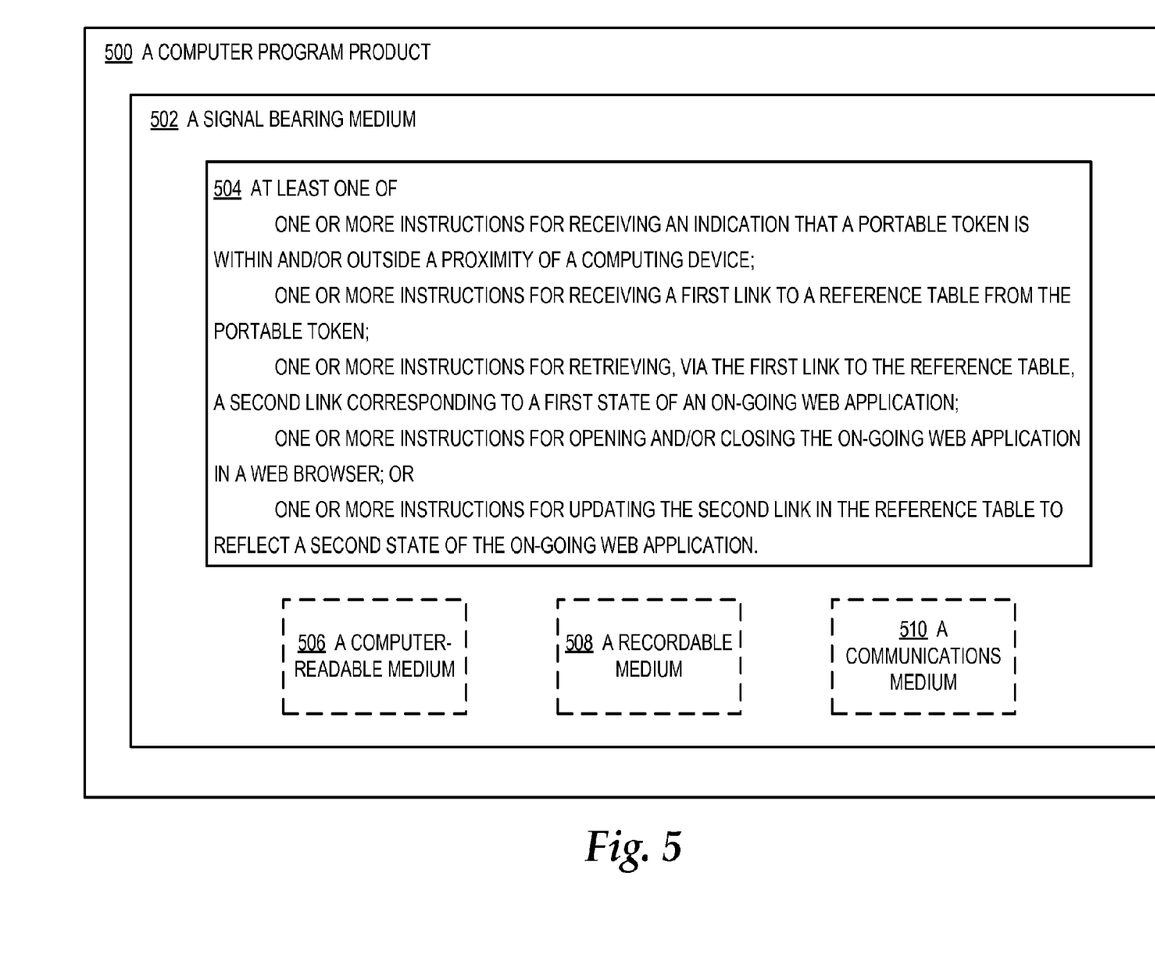
FIG. 5 is a schematic diagram illustrating a computer program product, all arranged according to at least some embodiments presented.

Turning now to FIG. 5, a schematic diagram that illustrates a partial view of a computer program product 500 that includes a computer program for executing a computer process on a computing device, arranged according to at least some embodiments presented herein. An illustrative embodiment of the example computer program product is provided using a signal bearing medium 502, and may include at least one instruction of 504: one or more instructions for receiving an indication that a portable token is within and/or outside a proximity of a computing device; one or more instructions for receiving a first link to a reference table from the portable token; one or more instructions for retrieving, via the first link to the reference table, a second link corresponding to a first state of an on-going web application; one or more instructions for opening and/or closing the on-going web application in a web browser; or one or more instructions for updating the second link in the reference table to reflect a second state of the on-going web application. The one or more instructions may be, for example, computer executable and/or logic implemented instructions. In some embodiments, the signal bearing medium 502 of the one or more computer program products 500 include a computer readable medium 506, a recordable medium 508, and/or a communications medium 510.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing a follow-me service, comprising:

receiving, through a computing device having a processor and a memory, a first link to a reference table from a portable token when the portable token is within a proximity to the computing device, and access control data, the reference table comprising a second link corresponding to a first state of an on-going web application;

retrieving, through the computing device, the second link from the reference table via the first link, wherein retrieving the second link from the reference table via the first link further comprises accessing, through the computing device, the first link to the reference table;

upon accessing the first link, receiving, through the computing device, an authentication request from the first link;

upon receiving the authentication request, sending, through the computing device, the access control data to the first link;

receiving, through the computing device, permission to access the reference table from the first link; and upon receiving the permission, retrieving, through the computing device, the second link from the reference table;

opening the on-going web application corresponding to the second link on a web browser configured to execute on the computing device;

upon opening the on-going web application on the web browser, updating, through the computing device, the second link in the reference table to reflect a second state of the on-going web application;

receiving, through the computing device, an indication that the portable token is outside the proximity of the computing device;

upon receiving the indication that the portable token is outside the proximity of the computing device, determining, through the computing device, whether the reference table reflects a current state of the on-going web application;

upon determining that the reference table does not reflect the current state of the on-going web application, updating, through the computing device, the second link in the reference table to reflect the current state of the on-going web application; and upon determining that the reference table reflects the current state of the on-going web application or upon updating the second link in the reference table to reflect the current state of the on-going web application, closing the on-going web application on the web browser.

2. The method of claim 1, wherein retrieving, through the computing device, the second link from the reference table via the first link further comprises retrieving, through the computing device, the second link and a corresponding cookie from the reference table, and wherein opening the on-going web application corresponding to the second link on a web browser configured to execute on the processor from the memory comprises:

transmitting, through the computing device, the cookie and a request to access the on-going web application to the second link;

upon transmitting the cookie and the request to access the on-going web application to the second link, receiving, through the computing device, permission to access the on-going web application from the second link; and upon receiving the permission to access the on-going web application, opening the on-going web application corresponding to the second link on the web browser.

3. The method of claim 1, further comprising:

receiving, through the computing device, an indication that the on-going web application has been closed; and upon receiving the indication that the on-going web application has been closed, removing, through the computing device, the second link from the reference table.

4. The method of claim 1, wherein updating, through the computing device, the second link in the reference table to reflect a second state of the on-going web application comprises replacing, through the computing device, the second link in the reference table with a third link corresponding to the second state of the on-going web application.

5. The method of claim 1, wherein updating, through the computing device, the second link in the reference table to reflect a second state of the on-going web application comprises updating, through the computing device, the second link in the reference table to reflect the second state of the on-going web application at a predefined time interval.

6. The method of claim 1, wherein the web application comprises a stateless, cloud-based web application.

7. A physical computer-readable storage medium having computer-executable instructions stored thereon which, when executed by a computer, cause the computer to:
receive, through the computer, an indication that a portable token is within a proximity of the computer;
when the indication is received that the portable token is within the proximity of the computer, receive, through the computer, a first link to a reference table from the portable token and access control data, the reference table comprising a second link corresponding to a first state of an on-going web application;
retrieve, through the computer, the second link from the reference table via the first link, wherein retrieving the second link from the reference table via the first link further comprises:
accessing, through the computer, the first link to the reference table;
upon accessing the first link, receiving, through the computer, an authentication request from the first link;
upon receiving the authentication request, sending, through the computer, the access control data to the first link;
receiving, through the computer, permission to access the reference table from the first link; and
upon receiving the permission, retrieving, through the computer, the second link from the reference table;
open the on-going web application corresponding to the second link on a web browser executed by the computer;
when the on-going web application is opened, update, through the computer, the second link in the reference table to reflect a second state of the on-going web application;
receive, through the computer, an indication that the portable token is outside the proximity of the computer;
upon receiving the indication that the portable token is outside the proximity to the computer system, determining whether the reference table reflects a current state of the on-going web application;
upon determining that the reference table does not reflect the current state of the on-going web application, updating the second link in the reference table to reflect the current state of the on-going web application;
upon determining that the reference table reflects the current state of the on-going web application or upon updating the second link in the reference table to reflect the current state of the on-going web application, closing the on-going web application on the web browser; and
when the indication that the portable token is outside the proximity of the computer is received, close the on-going web application on the web browser.

8. The physical computer-readable storage medium of claim 7, wherein the portable token comprises a pluggable device, and wherein the portable token is within the proximity of the computer when the portable token is plugged into the computer.

9. The physical computer-readable storage medium of claim 8, wherein the portable token is outside the proximity of the computer when the portable token is unplugged from the computer.

10. The physical computer-readable storage medium of claim 7, wherein the portable token comprises a wireless device, and wherein the portable token is within the proximity of the computer when the portable token is within a range of the computer according to a wireless protocol.

11. The physical computer-readable storage medium of claim 10, wherein the portable token is outside the proximity of the computer when the portable token is outside the range of the computer according to the wireless protocol.

12. The physical computer-readable storage medium of claim 7, wherein the portable token comprises a radio frequency identification tag, and wherein the portable token is within the proximity of the computer when the portable token is placed within a range of a radio frequency identification reader coupled to the computer, the range enabling communication between the radio frequency identification reader and the portable token.

13. The physical computer-readable storage medium of claim 12, wherein the portable token is outside the proximity of the computer when the portable token is placed again within the range of the radio frequency identification reader coupled to the computer.

14. The physical computer-readable storage medium of claim 7, wherein the first link and the second link comprise uniform resource locators.

15. A computer system for providing a follow-me service, comprising:
a processor;
a memory coupled to the processor;
a web browser which executes in the processor from the memory; and
a web browser plug-in coupled to the web browser, wherein the web browser plug-in is adapted to execute in the processor from the memory and, when executed by the processor, causes the computer system provide the follow-me service by:
receiving an indication that a portable token is within a proximity of the computer system;
upon receiving the indication that the portable token is within the proximity of the computer system, receiving a first link to a reference table, the reference table comprising a second link corresponding to a first state of an on-going web application;
retrieving the second link and a corresponding cookie from the reference table via the first link;
transmitting the cookie and a request to access the on-going web application to the second link;
upon transmitting the cookie and the request to access the on-going web application to the second link, receiving permission to access the on-going web application from the second link;
upon receiving the permission to access the on-going web application, opening the on-going web application corresponding to the second link on the web browser;
upon opening the on-going web application, updating the second link in the reference table to reflect a second state of the on-going web application;
receiving an indication that the portable token is outside the proximity to the computer system;
upon receiving the indication that the portable token is outside the proximity to the computer system, determining whether the reference table reflects a current state of the on-going web application;

upon determining that the reference table does not reflect the current state of the on-going web application, updating the second link in the reference table to reflect the current state of the on-going web application; and upon determining that the reference table reflects the current state of the on-going web application or upon updating the second link in the reference table to reflect the current state of the on-going web application, closing the on-going web application on the web browser.

16. The computer system of claim 15, wherein state information regarding the on-going web application is encoded in the second link.

17. The computer system of claim 15, wherein the reference table stores the second link in Extensible Markup Language.

18. The computer system of claim 15, wherein the reference table is user-specific.

* * * * *